Dec. 15, 1925.

L. E. PEARCH

MIRROR

Filed Jan. 13, 1925

1,565,291

Inventor
Lovell E. Pearch

By *[signature]*
Attorneys

Patented Dec. 15, 1925.

1,565,291

UNITED STATES PATENT OFFICE.

LOVELL E. PEARCH, OF SOUTH BEND, INDIANA.

MIRROR.

Application filed January 13, 1925. Serial No. 2,109.

*To all whom it may concern:*

Be it known that I, LOVELL E. PEARCH, a citizen of the United States, residing at South Bend, in the county of St. Joseph and State of Indiana, have invented a new and useful Mirror, of which the following is a specification.

This invention relates to a novel form of mirror whereby when a car is travelling closely behind another motor vehicle, the reflection of an approaching vehicle will be made in the mirror to warn the operator of an approaching vehicle.

Another object of the invention is to provide a plurality of mirrors and a supporting means for the mirrors, which supporting means may be adjusted to support the mirrors at various angles.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
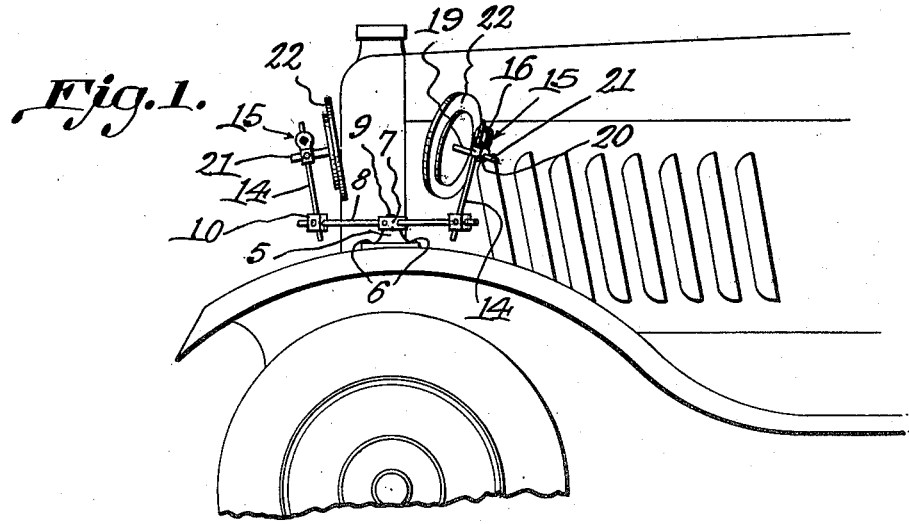
Figure 1 is a side elevational view illustrating a motor vehicle fender supplied with mirrors constructed in accordance with the invention.

Referring to the drawing in detail, the reference character 5 indicates the base of the support which may be secured to a motor vehicle fender as by means of the bolt 6. A head indicated at 7, forms a part of the base and is provided with a plurality of openings through which the rod 8 passes, set screw 9 being provided in the head for holding the rod in various positions of adjustment.

Adjustably supported on the rod 8 and arranged adjacent to the ends thereof are blocks 10 which are formed with bores 11 to accommodate the rod 8, set screws 12 being provided and extending through the blocks to engage the rod 8.

Bores 13 are also formed in the blocks 10 and are arranged at oblique angles with respect to the bores 11 to accommodate the vertical rods 14 so that the rods 14 may be adjusted with respect to the rod 8 to permit the mirrors, to be hereinafter more fully described, to be properly adjusted to accomplish the purpose of the invention.

Mounted for adjustment longitudinally of the rods 14, are supporting members 15 each of which including adjustable sections 16 which are identical in construction and which have teeth 17 adapted to mesh to restrict movement of one section with respect to the other section after an adjustment has been made. A bolt indicated at 18 is designed to connect the sections and hold them against movement with respect to each other.

The rods 14 extend through openings formed in the bosses 19 of one of the sections, while the bosses 20 of the opposite section and which are also formed with openings are designed to accommodate the rods 21 that are secured to the mirrors 22. Set screws 23 extend through the bosses and provide means whereby the rods may be secured in position to properly support the mirrors.

Figures 2, 3, 4:
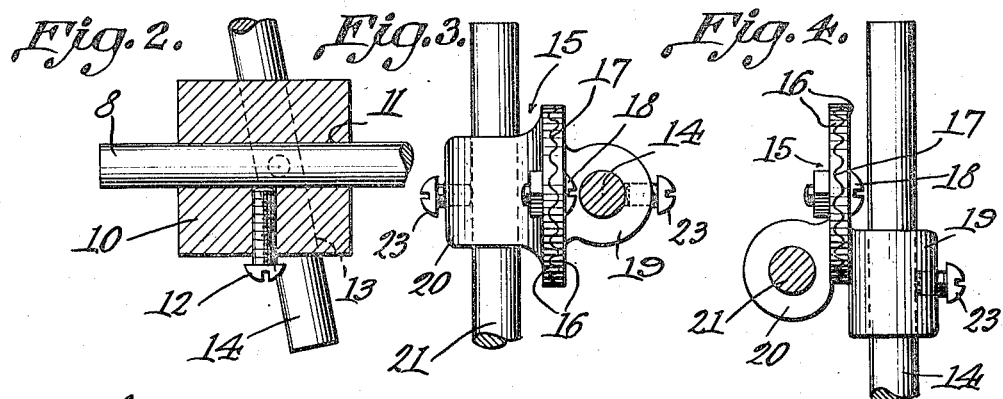
Figure 2 is a sectional view through the supporting block and supporting rods forming a part of the mirror support.
Figure 3 is a plan view of one of the mirror fixtures.
Figure 4 is a side elevational view of one of the mirror fixtures.
Figure 5:
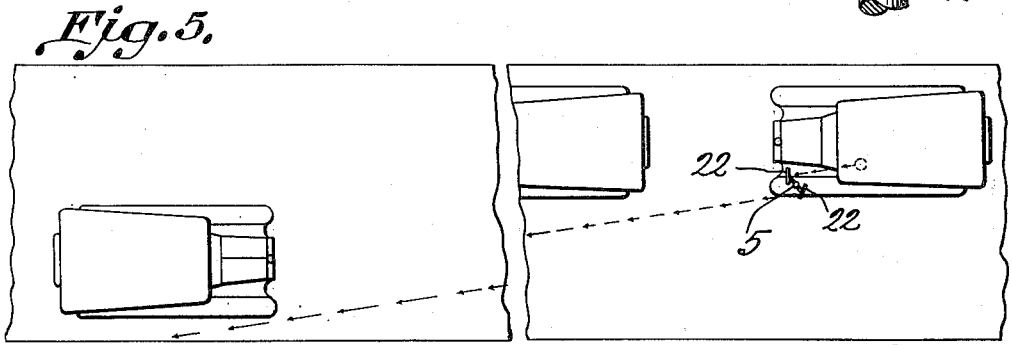
Figure 5 is a diagrammatic view illustrating the use of the invention.

In the use of the device, the mirrors are adjusted in a manner as clearly illustrated by Figure 4 of the drawing wherein the outermost mirror will reflect the outline of an approaching machine into the innermost mirror, which is in clear view of the operator, to the end that the operator will have a clear view of the road surface ahead of the car equipped with the mirrors to insure safety in passing vehicles.

I claim:—

In a device of the character described, a support, a horizontally disposed rod mounted on the support, supporting blocks adjustably mounted on the rod, vertical rods extending through the supporting blocks, and mounted for vertical adjustment therethrough, adjustable clamping members on the vertical rods, mirrors having supporting rods, said supporting rods adapted to extend through the adjustable clamping members, to adjustably support the mirrors, and said mirrors being mounted so that one mirror will reflect into the adjacent mirror.

In testimony that I claim the foregoing as my own, I have hereto affixed my signature.

LOVELL E. PEARCH.